United States Patent
Xie et al.

(10) Patent No.: US 10,841,797 B2
(45) Date of Patent: Nov. 17, 2020

(54) METHOD FOR GENERATING AND INJECTING SIMLOCK PASSWORD AND DEVICE FOR THE SAME

(71) Applicant: HUIZHOU TCL MOBILE COMMUNICATION CO., LTD., Huizhou (CN)

(72) Inventors: Hanwu Xie, Huizhou (CN); Xiaofen Zhong, Huizhou (CN)

(73) Assignee: HUIZHOU TCL MOBILE COMMUNICATION CO., LTD., Huizhou (CN)

(*) Notice: Subject to any disclaimer, the term of this patent is extended or adjusted under 35 U.S.C. 154(b) by 0 days.

(21) Appl. No.: 16/479,912

(22) PCT Filed: Jul. 20, 2018

(86) PCT No.: PCT/CN2018/096365
§ 371 (c)(1),
(2) Date: Jul. 22, 2019

(87) PCT Pub. No.: WO2019/015660
PCT Pub. Date: Jan. 24, 2019

(65) Prior Publication Data
US 2019/0387400 A1 Dec. 19, 2019

(30) Foreign Application Priority Data
Jul. 20, 2017 (CN) .......................... 2017 1 0595676

(51) Int. Cl.
*H04M 1/66* (2006.01)
*H04W 12/06* (2009.01)
(Continued)

(52) U.S. Cl.
CPC .......... *H04W 12/06* (2013.01); *G06F 16/245* (2019.01); *H04L 63/083* (2013.01)

(58) Field of Classification Search
CPC ....... H04W 12/06; H04W 12/02; H04W 8/18; H04W 8/24; G06F 16/245; H04L 63/083
See application file for complete search history.

(56) References Cited

U.S. PATENT DOCUMENTS

2010/0169660 A1* 7/2010 Voss ................ H04W 12/00409
713/183
2012/0149329 A1 6/2012 Mahmood et al.
(Continued)

FOREIGN PATENT DOCUMENTS

CN 102752754 A 10/2012
CN 104185167 A 12/2014
(Continued)

OTHER PUBLICATIONS

CNIPA First Office Action, dated Jun. 2, 2020 (7 pages).
SIPO First Office Action, dated Feb. 6, 2020 (7 pages).

*Primary Examiner* — Charles T Shedrick (57) ABSTRACT

The present application provides a method for generating a SIMLOCK password. The method includes: obtaining an IMEI number of a mobile terminal; searching for the IMEI number in a database; if the IMEI number is not found, randomly generating a SIMLOCK password so that the SIMLOCK password corresponds to the IMEI number; and sending the SIMLOCK password to the mobile terminal, wherein the database is configured to store the IMEI number and the SIMLOCK password corresponding to the IMEI number. Through the above manner, the present disclosure may improve security of the mobile terminal.

12 Claims, 4 Drawing Sheets

(51) Int. Cl.
*G06F 16/245* (2019.01)
*H04L 29/06* (2006.01)

(56) References Cited

U.S. PATENT DOCUMENTS

2014/0359288 A1    12/2014   Jensen et al.
2017/0013451 A1*   1/2017   Miao ..................... H04W 8/18
2017/0289804 A1*   10/2017   Kovacevic ............ H04L 63/102

FOREIGN PATENT DOCUMENTS

| CN | 104735251 A | 6/2015 |
| CN | 105407070 A | 3/2016 |
| CN | 105704704 A | 6/2016 |
| CN | 107635218 A | 1/2018 |
| TW | I240529 B | 9/2005 |

* cited by examiner

METHOD FOR GENERATING AND INJECTING SIMLOCK PASSWORD AND DEVICE FOR THE SAME

CROSS REFERENCE TO RELATED APPLICATIONS

The present application is a 35 U.S.C. § 371 National Phase conversion of International (PCT) Patent Application No. PCT/CN2018/096365 filed on Jul. 20, 2018, which claims foreign priority of Chinese Patent Application No. 201710595676.3, filed on Jul. 20, 2017, in China National Intellectual Property Administration, the contents of all of which are hereby incorporated by reference.

TECHNICAL FIELD

The present disclosure relates to the field of communication technologies, particularly to a SIMLOCK password generating and injecting method and device.

BACKGROUND

With the development of society, mobile phones become increasingly popular, and are used by almost everyone. If a mobile phone intends to achieve a communication function, a SIM card (Subscriber Identification Module, SIM; also known as a user identification card) needs to be installed. The SIM card is a personal data card of a digital mobile phone and uniquely identifies a user. It is manufactured by an encryption method and stores information of the digital mobile phone user, the encrypted key and the user's phonebook, etc. It is provided for the global system for mobile communications (GSM system) to authenticate the user identity and encrypt voice information of the user call, and at the same time, the user completes connection with the system and information exchange through the SIM card.

At present, operators and users have increasingly higher requirements for security of mobile phones, especially security of SIM cards. SIMLOCK passwords of many existing mobile phones generate corresponding passwords through algorithms, with international mobile equipment identity (IMEI) numbers of the mobile phones as inputs. The algorithms are built into software, and have been integrated therein when the software is compiled, and the passwords are determined accordingly. The inventor of the present disclosure has found out through long-term research and development that there are still some shortcomings in the existing methods. For example, a hacker can change the password of the mobile phone by tampering the IMEI number, thereby cracking into the mobile phone; or if the algorithm is deciphered, passwords of all the mobile phones can be known, which means the security factor is not high enough.

SUMMARY OF THE DISCLOSURE

The present disclosure is to provide a SIMLOCK password generating and injecting method and device, which can improve security of the mobile terminal.

An embodiment of the present disclosure may provide a method for injecting a SIMLOCK password, wherein the method may include: a mobile terminal receiving a SIMLOCK password sent by a SIMLOCK password generating device; the mobile terminal determining whether the mobile terminal itself has an injection flag configured to mark that the SIMLOCK password has already been injected into the mobile terminal; when the injection flag does not exist, the mobile terminal injecting the SIMLOCK password into a non-transitory memory thereof; after successful injection, the mobile terminal returning information of successful SIMLOCK password injection to the SIMLOCK password generating device; the mobile terminal again receiving a SIMLOCK password sent by the SIMLOCK password generating device; the mobile terminal comparing the SIMLOCK password received again with the previously injected SIMLOCK password; and when the two passwords are identical, the mobile terminal injecting the injection flag into its memory and returning information of successful SIMLOCK password verification.

An embodiment of the present disclosure may provide a method for generating a SIMLOCK password, wherein the method may include: obtaining an IMEI number of a mobile terminal; searching for the IMEI number in a database; when the IMEI number is not found, randomly generating a SIMLOCK password to make the SIMLOCK password correspond to the IMEI number; and sending the SIMLOCK password to the mobile terminal, wherein the database is configured to store the IMEI number and the SIMLOCK password corresponding to the IMEI number.

An embodiment of the present disclosure may provide a method for injecting a SIMLOCK password, wherein the method may include: a mobile terminal receiving a SIMLOCK password; the mobile terminal determining whether the mobile terminal itself has an injection flag configured to mark that the SIMLOCK password has already been injected into the mobile terminal; when the injection flag does not exist, injecting a SIMLOCK password into the mobile terminal.

An embodiment of the present disclosure may provide a SIMLOCK password generating device. The device may include a processor, a non-transitory memory and a communication circuit. Therein, the processor is coupled to the non-transitory memory and the communication circuit, and executes instructions during operation to implement the above method for generating a SIMLOCK password.

An embodiment of the present disclosure may provide a mobile terminal, including a processor, a non-transitory memory and a communication circuit, wherein the processor is coupled to the non-transitory memory and the communication circuit, and executes instructions during operation to implement the above method for generating a SIMLOCK password.

An embodiment of the present disclosure may provide a device having a storage function. The device may include a stored program which, when executed, implements the above method.

Differentiating from existing technologies in the art, the present disclosure is to provide a method for generating a SIMLOCK password, which may include: obtaining an IMEI number of a mobile terminal; searching for the IMEI number in a database; when the IMEI number is not found, randomly generating a SIMLOCK password to make the SIMLOCK password correspond to the IMEI number; and sending the SIMLOCK password to the mobile terminal, wherein the database is configured to store the IMEI number and the SIMLOCK password corresponding to the IMEI number. The SIMLOCK password of the present disclosure, which is randomly generated by a device other than the mobile terminal, has certain randomness and flexibility. SIMLOCK passwords of individual mobile terminals have certain independence and do not affect each other. Through the above method, it is possible to improve security of the mobile terminal.

DETAILED DESCRIPTION

In order to make the present disclosure clearer, the present disclosure will be further detailed below with reference to the accompanying drawings and embodiments.

Figure 1:
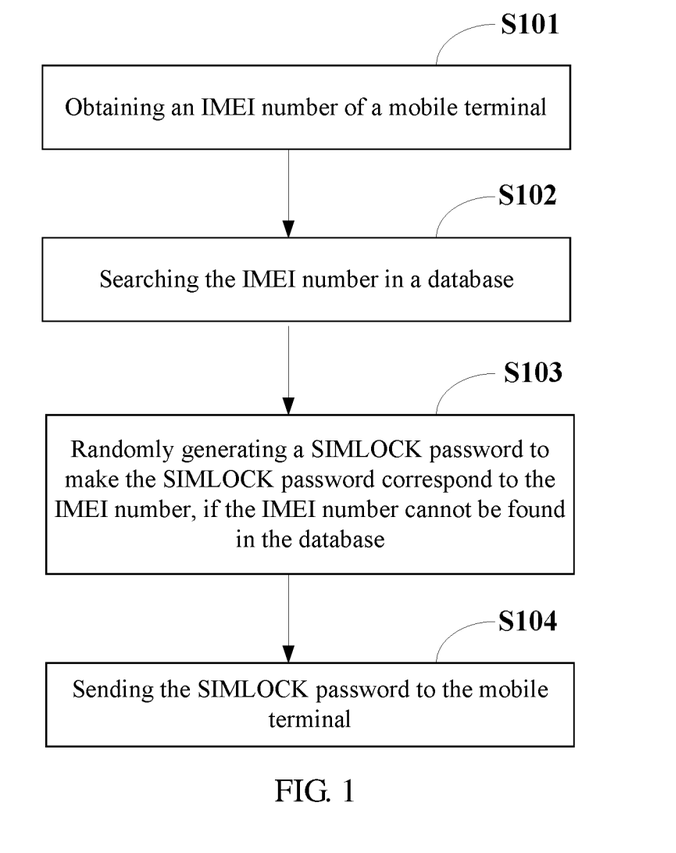
FIG. 1 is a flow chart of an embodiment of a method for generating a SIMLOCK password according to the present disclosure.

Referring to FIG. 1, which is a flow chart of an embodiment of a method for generating a SIMLOCK password according to the present disclosure. The present disclosure provides a method for generating a SIMLOCK password, wherein the method may include the steps as the following.

S101: an IMEI number of a mobile terminal may be obtained.

The IMEI number is an abbreviation of International Mobile Equipment Identity number. The international mobile equipment identification code is an "electronic serial number" composed of 15 digits, which corresponds to each mobile device one by one, and the code is unique in the world. Each mobile device will be assigned a globally unique set of numbers after completion of installation, and the set of numbers from production to initiation into service will be recorded by the manufacturer.

Specifically, a SIMLOCK password generating device may establish a connection with the mobile terminal. After successful connection, an IMEI number of the mobile terminal may be obtained. If the IMEI number does not exist, the mobile terminal may be shown to be an illegal mobile terminal, and error information "the IMEI number does not exist" may be returned, with no subsequent steps taken. If the connection fails, proceed with an attempt to connect again. If the connection fails more than a predetermined number of times, for example, 3 times, 5 times, 10 times, or the like, error information "the connection fails" will be returned.

In an embodiment, if the mobile terminal uses an Android® system, connection can be made through an Android Debug Bridge (ADB) command, wherein the ADB command is a universal debugging tool provided by Android. In other embodiments, if the mobile terminal uses other systems, such as an iOS® system, a Symbian system, a Microsoft® system, or the like, connection may be made by using a debugging tool corresponding to the system.

S102: the IMEI number may be searched in a database.

The database is configured to store an IMEI number and a SIMLOCK password corresponding to the IMEI number. Upon completion of injection of a password into the mobile terminal, the IMEI number of the mobile terminal and the SIMLOCK password corresponding thereto may be stored in the database to facilitate subsequent searching.

Specifically, the IMEI number may be searched in the database. If the IMEI number already exists in the database, it may indicate that the password has been injected into the mobile terminal without involving a need for further injection, and error information "the password has been injected" may be returned.

S103: if the IMEI number is not found, a SIMLOCK password may be generated randomly, so that the SIMLOCK password may correspond to the IMEI number.

Specifically, if there is no IMEI number in the database, it may indicate that no password has been injected into the mobile terminal, and a SIMLOCK password generating device may randomly generate a SIMLOCK password and send the password to the mobile terminal. The SIMLOCK password generating device may be a password generating tool in a computer, or may be an independent password generating device. The SIMLOCK password may be a password with a preset number of digits, for example, 20 digits, 15 digits, or the like; may be a digital password; or a random combination of different types of symbols such as numbers, letters and special symbols.

S104: the SIMLOCK password may be sent to the mobile terminal.

Specifically, the SIMLOCK password can be sent to the mobile terminal via an attention (AT) command. An AT command set is sent from Terminal Equipment (TE) or Data Terminal Equipment (DTE) to a Terminal Adapter (TA) or Data Circuit Terminal Equipment (DCE). Via the TA, the TE sends the AT command to control functions of a mobile station (MS) to interact with GSM network services. The SIMLOCK password may be sent to the mobile terminal through any communication modes, such as Bluetooth, Wi-Fi, and the like.

By the method of the above embodiment, the SIMLOCK password, which may be randomly generated by a device other than the mobile terminal, may have certain randomness and flexibility, and SIMLOCK passwords of individual mobile terminals may have certain independence and do not affect each other, which can improve security of the mobile terminals.

Figure 2:
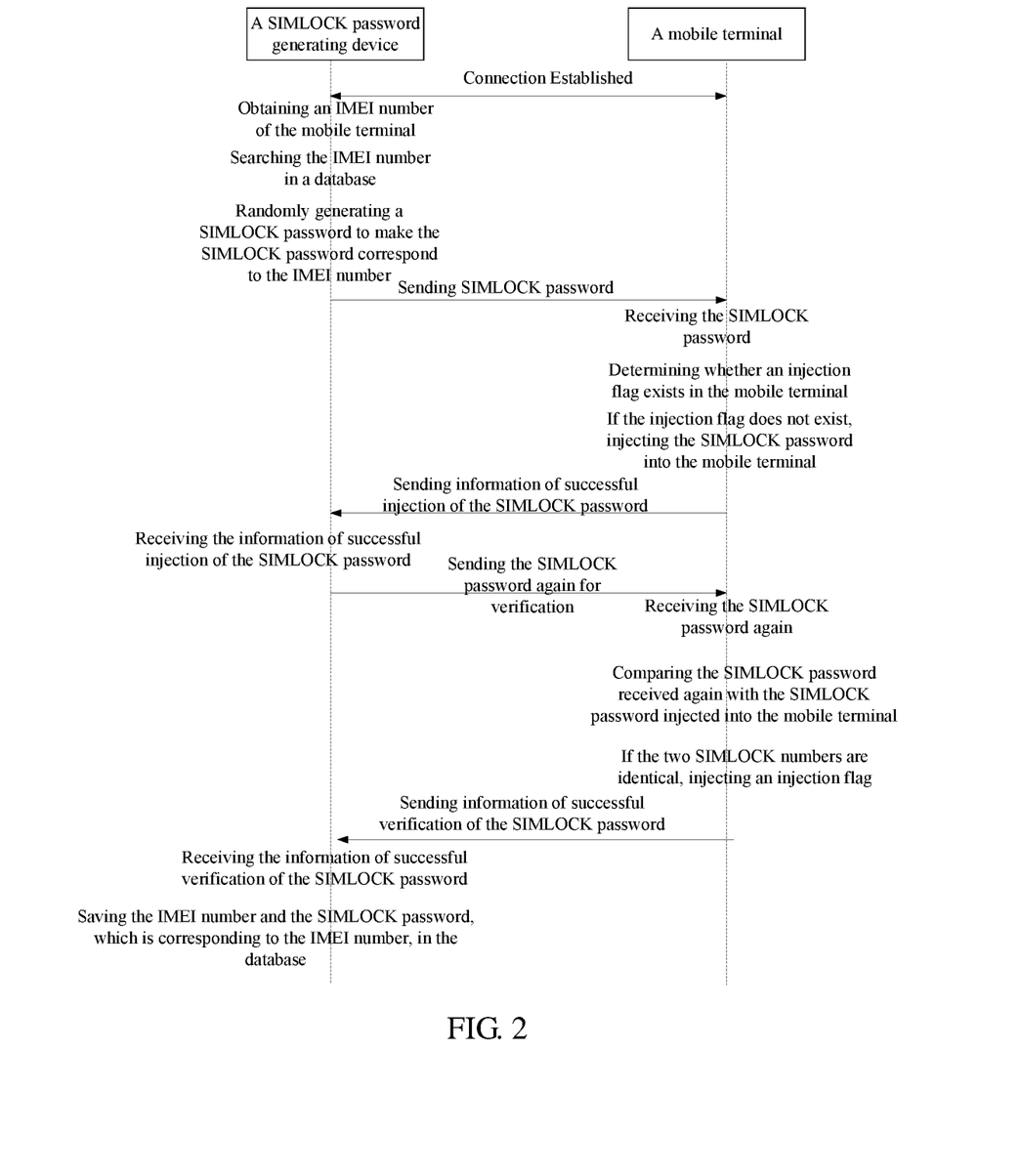
FIG. 2 is a flow chart of an embodiment of a method for generating a SIMLOCK password according to the present disclosure.

Referring to FIG. 2, which is a flow chart of another embodiment of a method for generating a SIMLOCK password according to the present disclosure. In this embodiment, a SIMLOCK password generating device, prior to sending a SIMLOCK password to a mobile terminal, may encrypt the password and send the encrypted data, wherein the password can be encrypted via an MD5 algorithm, a PBKDF2 algorithm or the like. In such manner, security of the password during the transmitting and sending procedures may be improved, thereby preventing the password from being intercepted during the delivery.

Subsequently, the mobile terminal may receive the SIMLOCK password. Specifically, upon receipt of the encrypted data, the mobile terminal may check integrity of the data by using a corresponding algorithm. If the check is passed, the SIMLOCK password may be obtained via decryption. It may be determined whether the SIMLOCK password has been injected to the mobile terminal, specifically, the determination may be performed by judging whether an injection flag exists in the mobile terminal. Therein, the injection flag may be configured to mark that the SIMLOCK password has been injected into the mobile terminal. If the injection flag already exists, it may indicate that the password has been injected into the mobile terminal without involving a need for further injection, and error information "the password has been injected" is returned. If the injection flag does not exist, it may indicate that no password has been injected into the mobile terminal, and then the SIMLOCK password may be injected into the mobile terminal. Specifically, the SIMLOCK password may be encrypted via a preset algorithm which can be a message-digest 5 (MD5) algorithm, a password-based key derivation function (PBKDF2) algorithm, or the like, before being injected and stored into the mobile terminal. In such a way, the security of the password can be further improved.

Upon completion of the SIMLOCK password injection and storage, information "SIMLOCK password injection success" may be returned and sent to the SIMLOCK password generating device. The SIMLOCK password generating device may receive the SIMLOCK password injection success information and send a SIMLOCK password again to the mobile terminal to verify the SIMLOCK password. The mobile terminal may receive the SIMLOCK password again and compare the newly received SIMLOCK password with the previously injected SIMLOCK password. If the two passwords are identical, it may indicate that the password has been successfully injected and the verification is passed, and the step of injecting the injection flag may be performed. Specifically, the injection flag may be stored in the mobile terminal to mark that the SIMLOCK password has been injected into the mobile terminal, and at the same time, information "SIMLOCK password verification success" may be returned and sent to the SIMLOCK password generating device. In this way, it may be verified whether there is an error during execution of the method, so as to further improve security of the password.

The SIMLOCK password generating device may receive the information "SIMLOCK password verification success," and save the IMEI number and the SIMLOCK password corresponding to the IMEI number to the database, so as to facilitate subsequent searching and complete the injection of the SIMLOCK password.

Through the method of the above embodiment, the SIMLOCK password may be encrypted and verified multiple times, which may further improve security of the SIMLOCK password.

Optionally, in another embodiment, the SIMLOCK password generating device may randomly generate two different SIMLOCK passwords which may not be interrelated. Then, the two different SIMLOCK passwords may be sent to the mobile terminal for injection. In such a way, the two passwords need to be verified concurrently during decoding. Even if one of the passwords may be deciphered, and the other password may be incorrect, the mobile phone still cannot be unlocked, which may reduce the risk of the password being deciphered and further improve security of the mobile phone.

Figure 3:
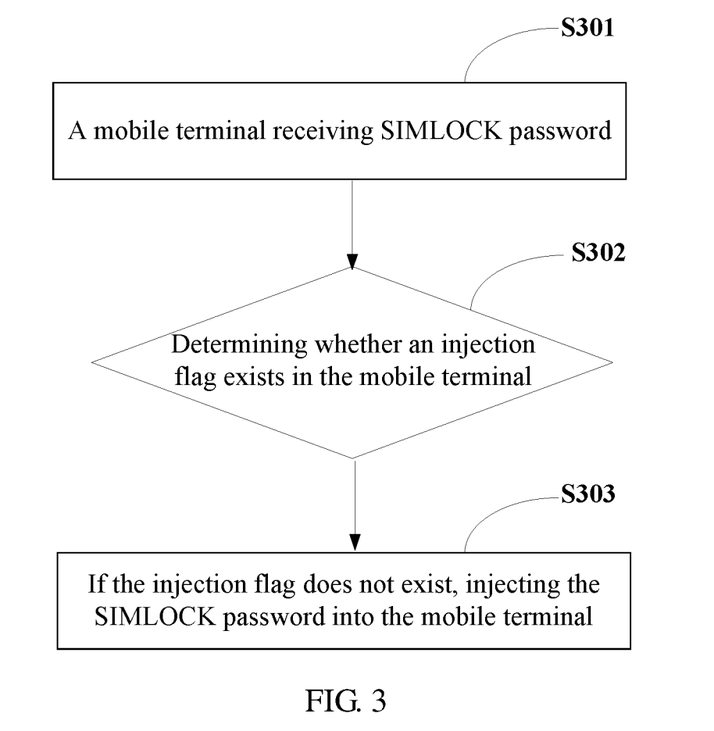
FIG. 3 is a flow chart of an embodiment of a method for injecting a SIMLOCK password according to the present disclosure.

Referring to FIG. 3, which is a flow chart of an embodiment of a method for injecting a SIMLOCK password according to the present disclosure. The present disclosure provides a method for injecting a SIMLOCK password, including following steps.

S301: a mobile terminal may receive a SIMLOCK password.

S302: it may be determined whether the mobile terminal has an injection flag configured to mark that the SIMLOCK password has been injected into the mobile terminal.

S303: if the injection flag does not exist, the SIMLOCK password may be injected into the mobile terminal.

Specifically, the mobile terminal may be a mobile phone, a tablet computer, a laptop computer, or the like. The detailed steps of implementing the method are the same as those described in the foregoing embodiments, and thus are omitted herein. For details, refer to the description of the corresponding embodiments as given above.

Figure 4:
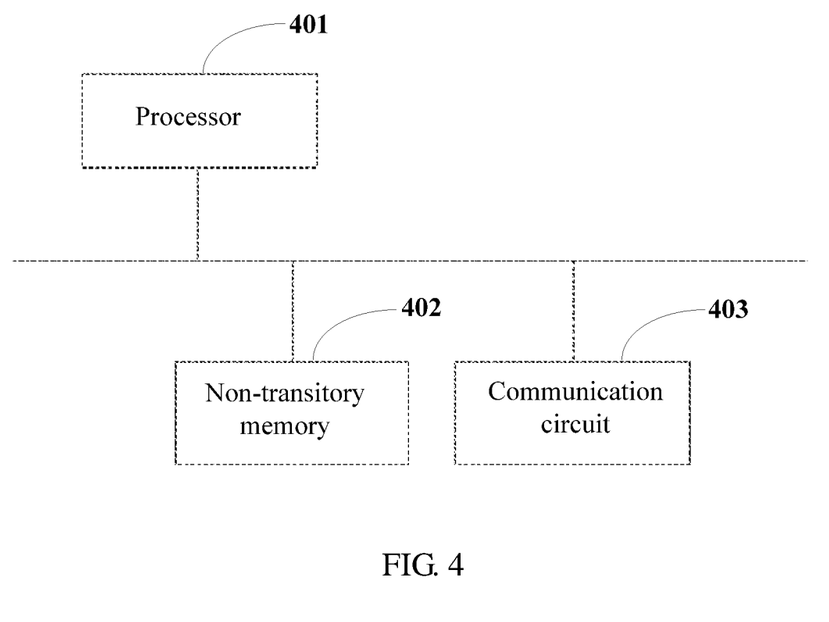
FIG. 4 is a structural diagram of an embodiment of a SIMLOCK password generating device according to the present disclosure.

Referring to FIG. 4, which is a structural diagram of an embodiment of a SIMLOCK password generating device according to the present disclosure. The present disclosure provides a SIMLOCK password generating device, which may include a processor 401, a memory 402 and a communication circuit 403. Therein, the processor 401 may be coupled to the memory 402 and the communication circuit 403.

The processor 401 may be configured to receive a SIMLOCK password through the communication circuit 403.

The processor 401 may be further configured to determine whether the processor itself has an injection flag, wherein the injection flag is configured to mark that the SIMLOCK password has been injected into the mobile terminal.

The processor 401 may be further configured to inject the SIMLOCK password into the memory 402 when there is no injection flag.

In other embodiments, the processor 401 may be further configured to send SIMLOCK password injection success information through the communication circuit 403, after injecting the SIMLOCK password into the memory 402.

The processor 401 may be further configured to receive a SIMLOCK password again through the communication circuit 403 and to compare the SIMLOCK password received again with the previously injected SIMLOCK password.

When the two passwords are identical, the processor 401 may be further configured to inject an injection flag into the memory 402 and to send SIMLOCK password verification success information through the communication circuit 403.

The processor 401 may be specifically configured to receive two different SIMLOCK passwords through the communication circuit 403.

The processor 401 may be specifically configured to inject the received two different SIMLOCK passwords into the memory 402.

The processor 401 may be specifically configured to receive two different SIMLOCK passwords again through the communication circuit 403 and compare the two different SIMLOCK passwords received again with the previously injected two SIMLOCK passwords.

The specific working process is identical to that described in the above method embodiments, and therefore is omitted herein. For details, refer to the description of the corresponding method steps as given above. Therein, the SIMLOCK password generating device may be a password generating tool in the computer, and can also be an independent password generating device.

Figure 5:
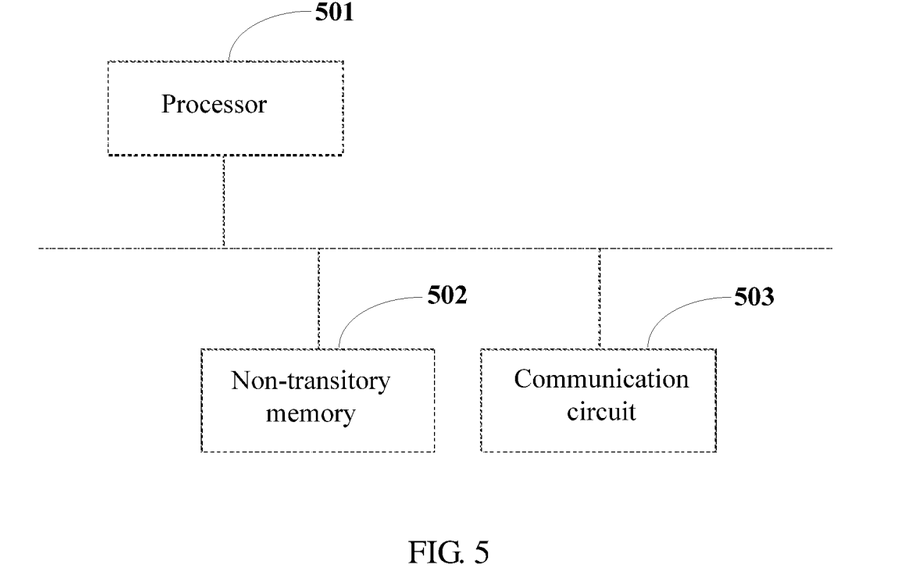
FIG. 5 is a structural diagram of an embodiment of a mobile terminal according to the present disclosure.

Referring to FIG. 5, which is a structural diagram of an embodiment of a mobile terminal according to the present disclosure. The present disclosure provides a mobile terminal, which may include a processor 501, a non-transitory memory 502 and a communication circuit 503. Therein, the processor 501 may be coupled to the memory 502 and the communication circuit 503.

The non-transitory memory 502 may be configured to store an IMEI number and a SIMLOCK password corresponding to the IMEI number. The processor 501 may be configured to obtain the IMEI number of the mobile terminal through the communication circuit 503 and to search for the IMEI number in a database of the non-transitory memory 502, wherein the database may be configured to store the IMEI number. The processor 501 may be further configured to randomly generate a SIMLOCK password when the IMEI number is not found, so that the SIMLOCK password corresponds to the IMEI number. The processor 501 may be further configured to send the SIMLOCK password to the mobile terminal via the communication circuit 503.

In other embodiments, the processor 501 may be specifically configured to randomly generate two different SIMLOCK passwords when the IMEI number is not found.

The processor 501 may be further configured to receive information of SIMLOCK password injection success via the communication circuit 503 and to send a SIMLOCK password again to the mobile terminal via the communication circuit 503 to verify the SIMLOCK password.

The processor 501 is further configured to receive SIMLOCK password verification success information via the communication circuit 503 and save the IMEI number and the SIMLOCK password corresponding to the IMEI number to the database of the memory 50. Therein, the database is configured to store the IMEI number and the SIMLOCK password corresponding to the IMEI number.

The specific working process is identical to that described in the above method embodiments, and therefore is not omitted herein. For details, refer to the description of the corresponding method steps as given above. The mobile terminal can be a mobile phone, a tablet computer, a laptop computer, or the like.

Figure 6:
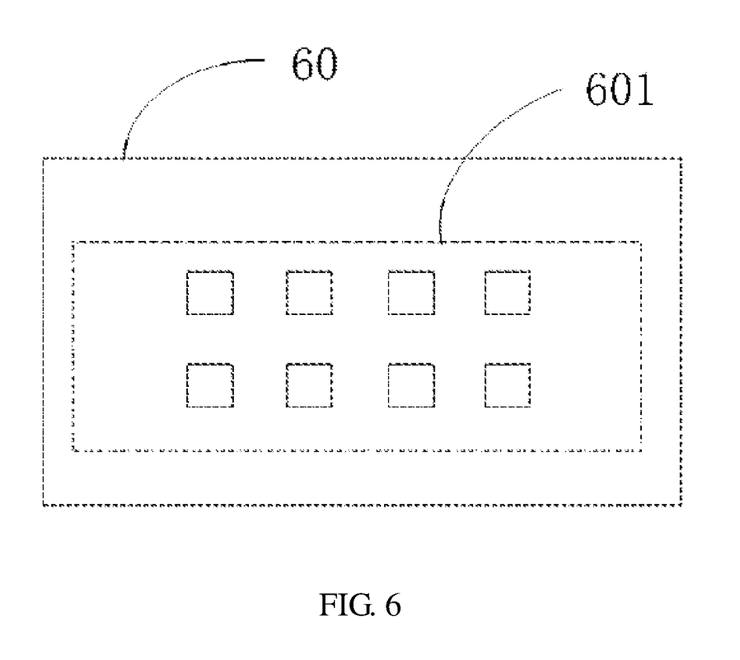
FIG. 6 is a structural diagram of an embodiment of a device having a storage function according to the present disclosure.

Referring to FIG. 6, which is a structural diagram of an embodiment of a device having a storage function according to the present disclosure. The present disclosure provides a device 60 having a storage function. The storage device 60 may store a program 601 which, when executed, implements the above method. The specific working process is identical to that described in the above method embodiments, and therefore is omitted herein. For details, refer to the description of the corresponding method steps as given above. The device having a storage function can be a portable storage medium such as a USB flash drive, an optical disk, and can also be a terminal, a server, or the like.

The embodiments of the present disclosure, or part contributive to the prior art, or all or part of the disclosure may be embodied in the form of a software product. The computer software product, which is stored in a storage device, comprises a plurality of instructions to cause a computer device (which can be a personal computer, a server, a network device or the like) or a processor to execute all or part of the steps of the method according to each embodiment of the present disclosure. The foregoing storage device includes various devices which can store program codes, such as a USB flash drive, a mobile hard disk, a read-only memory (ROM), a random access memory (RAM), a magnetic disk or an optical disk, and the like.

The above description is about embodiments of the present disclosure only, but does not limit the scope of the present disclosure. Equivalent structures or transformation of processes based on the specification and appended figures of the present disclosure, which are used directly or indirectly in other related arts, should be within the scope of the present disclosure.

What is claimed is:

1. A method for injecting a SIMLOCK password, wherein the method comprises:
   a mobile terminal receiving a first received SIMLOCK password, which is sent by a SIMLOCK password generating device;
   the mobile terminal determining whether the mobile terminal itself has an injection flag configured to mark that a SIMLOCK password has already been injected into the mobile terminal;
   the mobile terminal injecting the first received SIMLOCK password into a non-transitory memory thereof when the injection flag does not exist;
   after the first received SIMLOCK password is injected into the mobile terminal successfully, the mobile terminal returning information of successful injection of the first received SIMLOCK password to the SIMLOCK password generating device;
   the mobile terminal receiving a second received SIMLOCK password sent by the SIMLOCK password generating device;
   the mobile terminal comparing the second received SIMLOCK password with the first received SIMLOCK password; and
   the mobile terminal injecting the injection flag into the non-transitory memory thereof and returning information of successful verification of SIMLOCK password when the first received and the second received passwords are identical.

2. The method for injecting a SIMLOCK password according to claim 1, wherein the first received SIMLOCK password comprises a first password and a second password, the first password is different from the second password, and the mobile terminal receiving the first received SIMLOCK password sent by the SIMLOCK password generating device comprises:
   the mobile terminal receiving the first SIMLOCK password and the second SIMLOCK password sent by the SIMLOCK password generating device.

3. The method for injecting a SIMLOCK password according to claim 2, wherein the mobile terminal injecting the first received SIMLOCK password into the non-transitory memory thereof comprises:
   the mobile terminal injecting the the first and second SIMLOCK passwords into the non-transitory memory thereof.

4. The method for injecting a SIMLOCK password according to claim 2, wherein the second received SIMLOCK password comprises a third password and a fourth password, the third password is different from the fourth password, the mobile terminal receiving the second received SIMLOCK password sent by the SIMLOCK password generating device and said comparing the second received SIMLOCK password with the first received SIMLOCK password comprise:
   the mobile terminal receiving the third SIMLOCK password and the fourth password sent by the SIMLOCK password generating device;
   the mobile terminal comparing the first password and the third password and comparing the second password and the fourth password to generate a password comparison result; and
   the mobile terminal injecting an injection flag into the non-transitory memory thereof and returning information of successful verification of SIMLOCK password when the password comparison result shows the first password is identical with the third password, and the second password is identical with the fourth password.

5. The method according to claim 1, wherein, before the mobile terminal receiving the first received SIMLOCK password sent by the SIMLOCK password generating device, the method further comprises encryption of the SIMLOCK password by algorithms.

6. The method according to claim 5, wherein the mobile terminal injecting the first received SIMLOCK password into the non-transitory memory thereof when the injection flag does not exist comprises encryption of the first received SIMLOCK password by algorithms.

7. A mobile terminal, wherein the mobile terminal comprises a processor, a non-transitory memory, and a communication circuit, wherein the processor is coupled to the non-transitory memory and the communication circuit, the processor is configured to:

receive a first received SIMLOCK password through the communication circuit;

determine whether the processor itself has an injection flag configured to mark that a SIMLOCK password has been injected into the mobile terminal; and inject the SIMLOCK password into the non-transitory memory when the injection flag does not exist.

8. The mobile terminal according to claim 7, wherein the processor is further configured to send information of successful injection of the first received SIMLOCK password via the communication circuit after injecting the SIMLOCK password into the non-transitory memory.

9. The mobile terminal according to claim 7, wherein the processor is further configured to receive a second received SIMLOCK password via the communication circuit and compare the second received SIMLOCK password with the first received SIMLOCK password; and when the first received and the second received passwords are identical, the processor is further configured to inject an injection flag into the non-transitory memory and to send information of successful verification of the SIMLOCK password via the communication circuit.

10. The mobile terminal according to claim 7, wherein the first received password comprises a first password and a second password, the first password is different from the second password, and the processor is specifically configured to receive the first and the second SIMLOCK passwords via the communication circuit.

11. The mobile terminal according to claim 10, wherein the processor is specifically configured to inject the the first and the second SIMLOCK passwords into the non-transitory memory.

12. The mobile terminal according to claim 10, wherein the second received password comprises a third password and a fourth password, the third password is different from the fourth password, and the processor is specifically configured to receive the third and the fourth SIMLOCK passwords via the communication circuit and to compare the first password with the third password and compare the second password with the fourth password; and when a comparison result shows the first password is identical with the third password and the second password is identical with the fourth password, the mobile terminal injects an injection flag into the non-transitory memory thereof and returns information of successful verification of SIMLOCK password.

* * * * *